US011820563B1

(12) United States Patent
Diaz

(10) Patent No.: US 11,820,563 B1
(45) Date of Patent: Nov. 21, 2023

(54) PACKAGING AND DELIVERY SYSTEM

(71) Applicant: Maria T. Diaz, Los Angeles, CA (US)

(72) Inventor: Maria T. Diaz, Los Angeles, CA (US)

( * ) Notice: Subject to any disclaimer, the term of this patent is extended or adjusted under 35 U.S.C. 154(b) by 181 days.

(21) Appl. No.: 17/351,285

(22) Filed: Jun. 18, 2021

Related U.S. Application Data

(60) Provisional application No. 63/040,953, filed on Jun. 18, 2020.

(51) Int. Cl.
| | |
|---|---|
| *B65D 5/74* | (2006.01) |
| *B65B 5/04* | (2006.01) |
| *B65D 5/42* | (2006.01) |
| *B65D 5/48* | (2006.01) |
| *B65D 5/72* | (2006.01) |
| *B65B 69/00* | (2006.01) |
| *B65D 5/49* | (2006.01) |

(52) U.S. Cl.
CPC .............. *B65D 5/724* (2013.01); *B65B 5/04* (2013.01); *B65B 69/005* (2013.01); *B65D 5/4204* (2013.01); *B65D 5/48024* (2013.01)

(58) Field of Classification Search
CPC ...... B65D 5/724; B65D 5/4204; B65D 25/54; B65D 5/725; B65B 5/04; B65B 69/005
USPC ................ 220/495.03; 206/776, 782; 53/467
See application file for complete search history.

(56) References Cited

U.S. PATENT DOCUMENTS

| | | | | |
|---|---|---|---|---|
| 5,337,915 A | * | 8/1994 | Hall, Jr. .................. | B65D 25/16 426/115 |
| 5,934,551 A | * | 8/1999 | Kaufman ........... | B65D 5/48042 229/120.32 |
| 5,992,683 A | * | 11/1999 | Sigl .......................... | B65H 1/08 221/56 |
| 6,758,340 B1 | * | 7/2004 | Feibelman ........... | B65D 5/4204 206/775 |
| 9,451,851 B1 | * | 9/2016 | Lukawski ............. | A47K 10/422 |
| 2003/0057222 A1 | * | 3/2003 | Milliorn ................ | B65D 77/06 221/48 |

OTHER PUBLICATIONS

"Why Do We Wrap Gifts? A Brief History of Wrapping Paper", Lilly Feinn Dec. 14, 2015 (https://www.bustle.com/articles/129687-why-do-we-wrap-gifts-a-brief-history-of-wrapping-pape.

* cited by examiner

*Primary Examiner* — Robert F Long
*Assistant Examiner* — Xavier A Madison
(74) *Attorney, Agent, or Firm* — GUGLIOTTA & GUGLIOTTA LPA

(57) ABSTRACT

An outer container forms a windowed conduit holding an inner tray aligned within the windowed conduit. A containment membrane is supported in the tray window. A pair of frangible sheathes covering each end of the windowed conduit. The containment membrane is filled with content(s) to be delivered and the membrane secured within the inner tray. The tray is held within the outer container such that the containment membrane is positioned within the container such that it may be eventually delivered through a first outer window. The first outer window is positioned on one side of the container and covered with a first frangible element. A second outer window is aligned with the first window at the opposite side of the container forming the conduit. A second frangible element covers the second window such that the containment membrane sits between the pair of aligned windows.

2 Claims, 4 Drawing Sheets

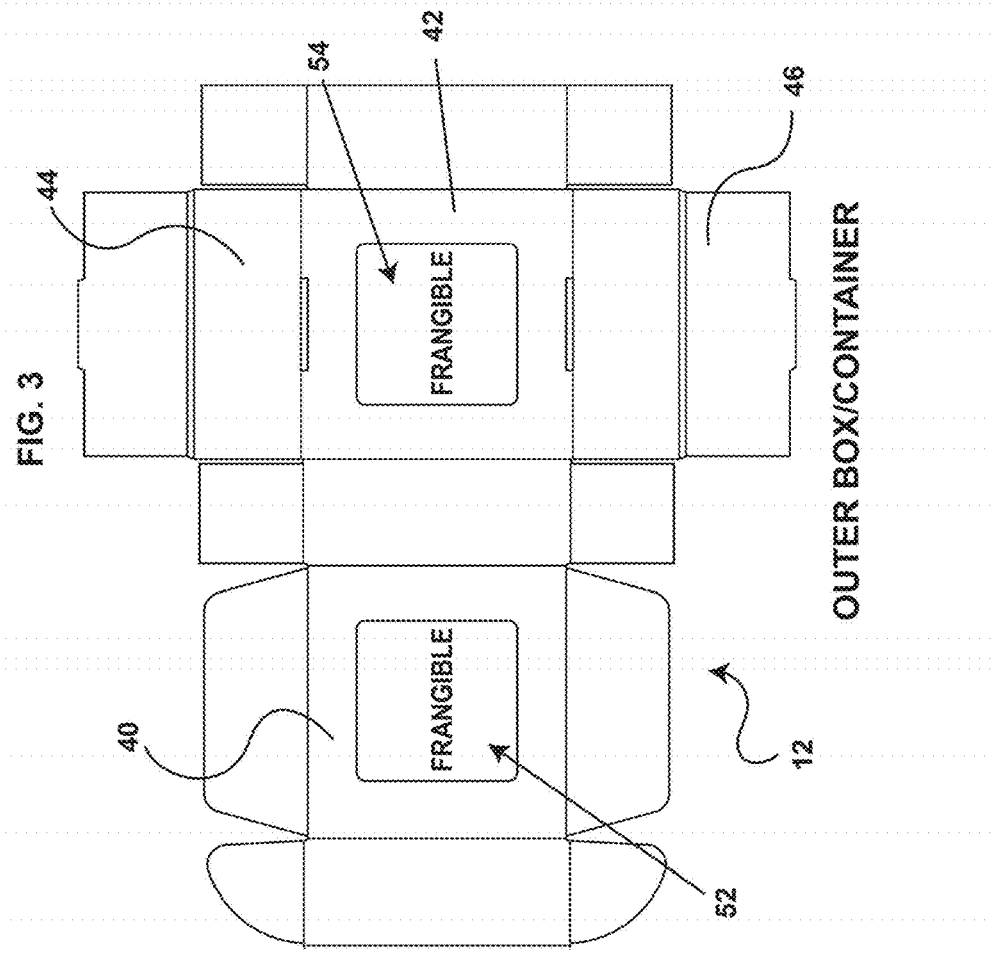
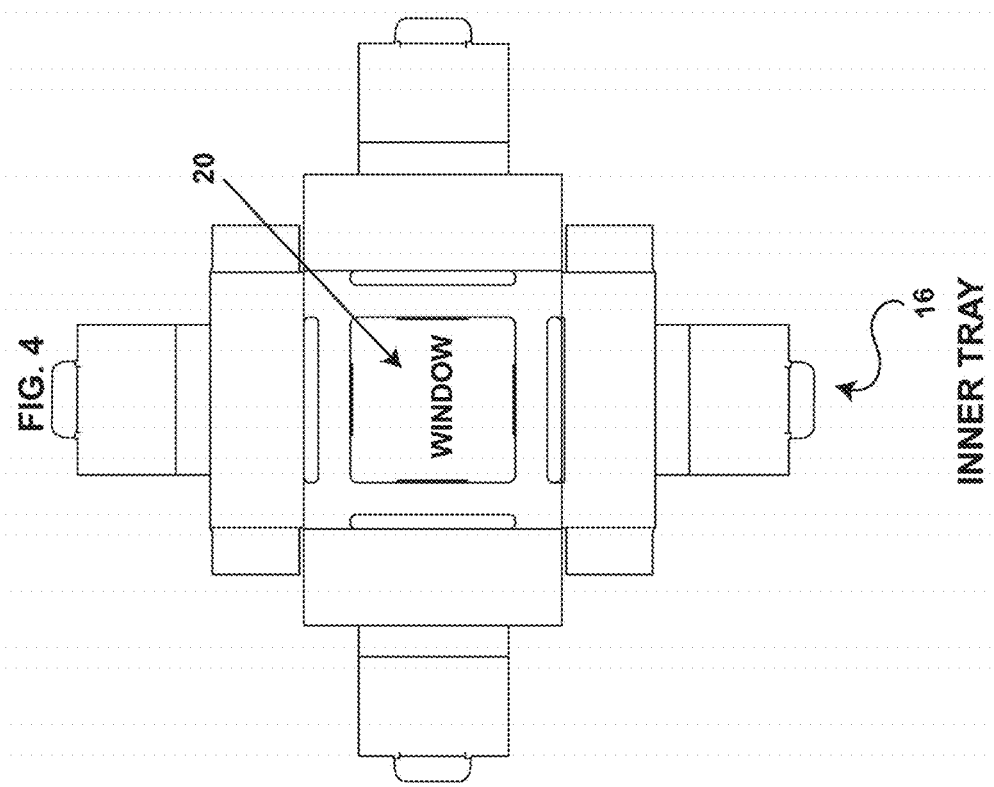

INSERT TRAY BOTTOM VIEW

INSERT TRAY TOP VIEW

PACKAGING AND DELIVERY SYSTEM

RELATED APPLICATIONS

The present disclosure claims benefit of U.S. Provisional Application 63/040,953 filed on 18 Jun. 2020 and incorporated by reference as if fully rewritten herein.

COPYRIGHT NOTICE

Pursuant to 37 C.F.R. 1.71(d)-(e)(1988), a portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

BACKGROUND OF THE INVENTION

1. Field of the Invention

The present invention relates generally to packaging systems and designs and, more particularly, to such a packaging and delivery system in which the act of opening provides a surprise entertainment function.

2. Description of the Related Art

Many products are sold at the retail level in boxes or packaging that is made of paper, cardboard or plastic materials. While the main function of such packaging is for protection of the enclosed product during distribution and shipping, the outer container surfaces have evolved to provide ornamentation that is generally geared more toward marketing or informational functions.

However, in many circumstances the packaging is obscured in ornamental ways in order to provoke a surprise factor associated with its unwrapping. In many cultures this can be associated with a holiday, birthday or other event. With such "gift wrapping" an object or gift is enclosed in a less functional and more ornamental material that obscures the object or gift. Such gift wrapping may be a decorative paper, or alternately a gift box or bag. A wrapped or boxed gift may be held closed with ribbon and topped with a decorative bow (an ornamental knot made of ribbon). A recent psychological study tested whether the wrapping of the gift influences the recipient to have a more favorable attitude toward the item inside. Those who received wrapped gifts rated their gift more favorably, and nicely wrapped presents were favored over unwrapped or "non-traditionally" wrapped gifts.[1]

See https://www.bustle.com/articles/129687-why-do-we-wrap-gifts-a-brief-history-of-wrapping-paper As such, hiding an object within a decorative packaging, and even one that obscures the contents inside and requires unwrapping, may positively increase the experience associated with receipt of the object itself. In various unrelated areas, such 'surprise packaging' is known in which the event of opening the packaging itself is also an additional part of the gift. For example, in a European and Asian tradition later brought to North America, a piñata is used as a decorative container often made of papier-mâché, pottery, or cloth and filled with small toys or candy, or both, that is broken as part of a ceremony or celebration to randomly dispense the contents to the participants. In other situations, more prominently with food, confections are used to enclosed different edibles. For example, International Patent Publication WO1993000267A1, published in the name of Ferrero, teaches a "container for surprise gifts and the like, for example, for chocolate eggs" in which an assembled container holds a 'surprise gift(s)' and is placed within a hollow chocolate egg. The user consumes the chocolate egg to access the container inside, and is left with the 'surprise gift' that was inside.

In these and other conventional examples there are some common features: an inner 'surprise' is contained and obscured; the act of 'unwrapping' the outer covering both delivers the 'surprise' and creates an event excitement or anticipation during the mere act of unwrapping; the outer 'wrapping' is single use and is consumed to create a first 'event' reaction; and, the inner item contained within the consumed package provides a second 'event' reaction to the recipient.

Other functions for surprise packaging may also exist. By way of example, "blind box packaging" is a recent increasing trend in the toy industry. From its apparent inception with the rise in popularity of the "unboxing video" phenomenon of YouTube® of 20 year ago, the use today is for a toy packaging that allows for brand packaging but does not actually show the product that is inside. Also known as "blind bags: or "surprise packs", the experience of removing the toy from the packaging has become part of the product. The anticipation and suspense of opening the package in order to reveal the toy inside is also part of the purchase.

Consequently, the adaptation of several or many of these surprise packaging features may be used to form a packaging device capable of the unique delivery of its contents.

SUMMARY OF THE INVENTION

It is thus an object of the present invention to provide a packaging system for an event delivery of its contents.

It is a feature of the present invention to provide a packaging system having a box supporting a frangible window (or windows) through which contents may be discharged to be delivered.

The present invention provides a system and method for containing gifts comprising essentially: an outer container forming a windowed conduit; an inner tray aligned within the windowed conduit; a containment membrane supported in the tray window; and a pair of frangible sheathes covering each end of the windowed conduit. The containment membrane is filled with contents to be delivered and the membrane secured within the inner tray. The tray is held within the outer container such that the containment membrane is positioned within the container such that it may be eventually delivered through a first outer window. The first outer window is positioned on one side of the container and covered with a first frangible element. A second outer window is aligned with the first window at the opposite side of the container. A second frangible element covers the second window such that the containment membrane sits between the pair of aligned windows. The system can be loaded with variable contents in such a position to be rigged for subsequent delivery.

According to a main aspect of the present invention, the method of delivery may be likened similar to a hand-held pinata in which the contents are expelled via punching through both frangible-covered windows in order to deliver the contents through the first frangible-covered window. It should be understood that other aspects of such a method may be adapted from or inherent to such a system, and as such a main aspect should be considered merely exemplary and not limiting.

It is an advantage of the present invention to provide a surprise packaging that contains and obscures a contained an object, gift or surprise until deployed.

It is another advantage of the present invention to provide for a percussive act of unwrapping or deploying the contained object(s).

It is yet another advantage of the present invention to create a condition for delivering or deploying the contained object in a manner that may create an event excitement or anticipation during the act of unwrapping, revealing or deploying.

While according to one aspect of the present invention the system may be provided as an outer wrapping for a single use that is consumed, it is another advantage of the present invention to allow for such a system to be adapted for multiple event uses.

Further objects, features, elements and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 3 is a die-cut outline for an outer box container for use therewith;

FIG. 4 is a die-cut outline for an inner tray for use therewith;

DESCRIPTION OF THE PREFERRED EMBODIMENTS

The best mode for carrying out the invention is presented in term of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. As such, as related to the present invention the containment membrane should be broadly construed to act as a captured inner container from which contents are subsequently disbursed. Also, as related to the present invention the contents themselves should be broadly defined to relate generally to contents of any form, whether a message, gift, surprise, toy, treasure, object or an hidden object capable of being retained and subsequently delivered via an integrated system.

For purposes of the present disclosure the terms "a" and "an" herein do not denote a limitation of quantity, but rather denote the presence of at least one (1) of the referenced items. Further for purposes of the present disclosure the terms "in", "out", "left" "right", "up" or "down" are all spacial and functionally relative directions used to aid in the description to best explain the principles of the invention and its practical application, and to aid others skilled in the art to best utilize the invention and are not meant to be limiting to any particular orientation. It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. Detailed Description of the Figures

Figure 1:
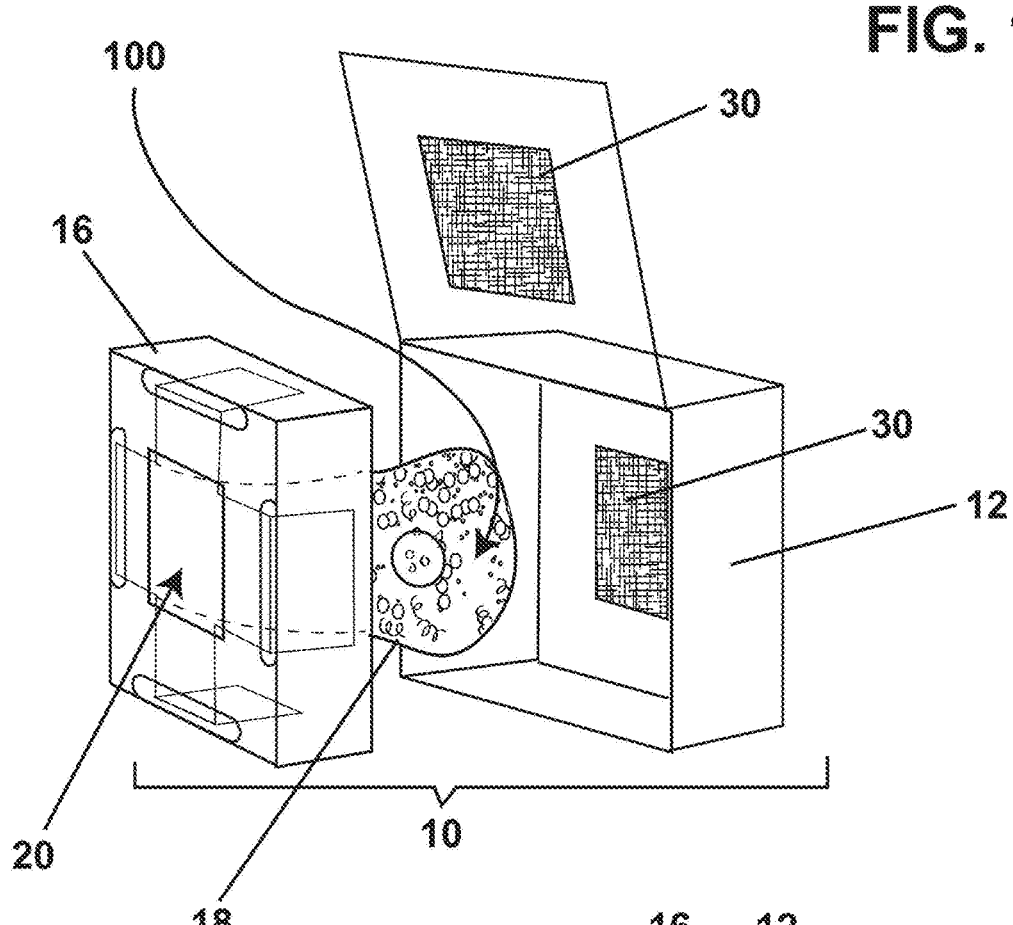
FIG. 1 is a partially exploded perspective view of a packaging and delivery system according to an exemplary preferred embodiment of the present invention.
Figure 2:
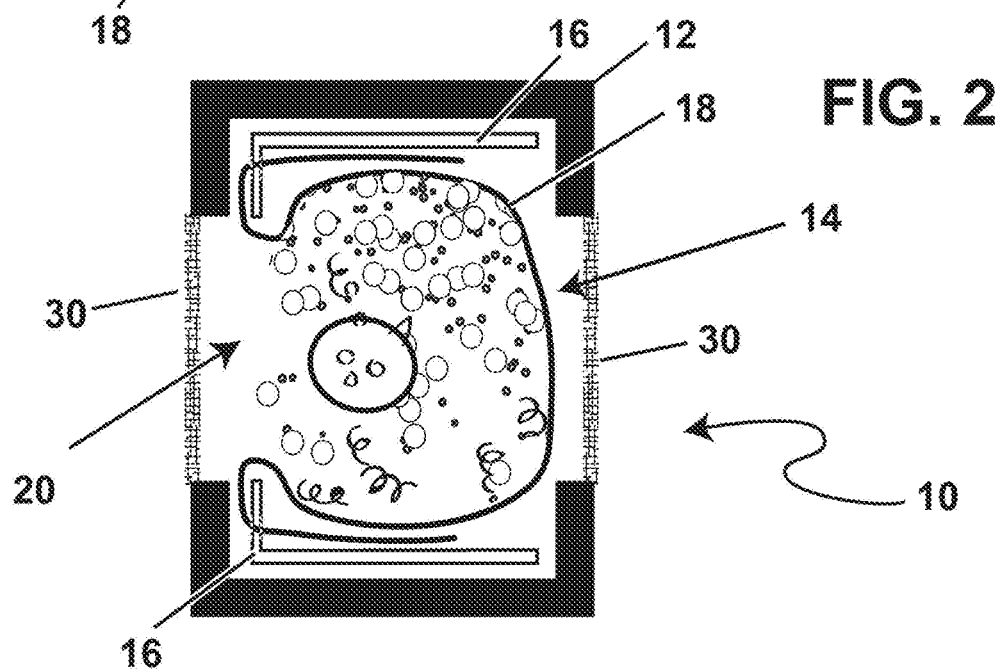
FIG. 2 is a cross-sectional schematic view thereof.
Figure 4B:
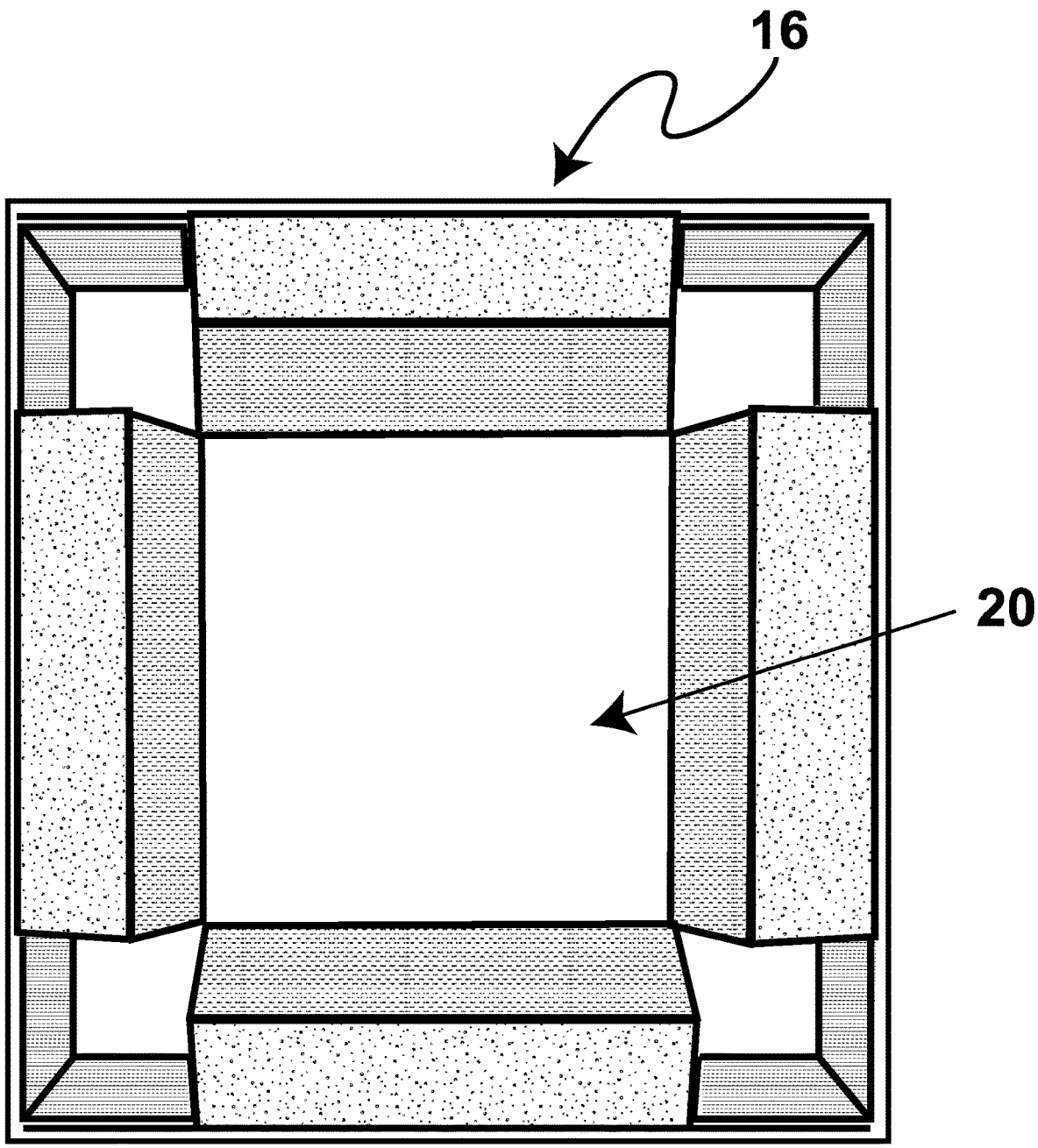
FIG. 4B is a photograph of a bottom plan view of an implementation of the inner tray for use therewith.
Figure 4C:
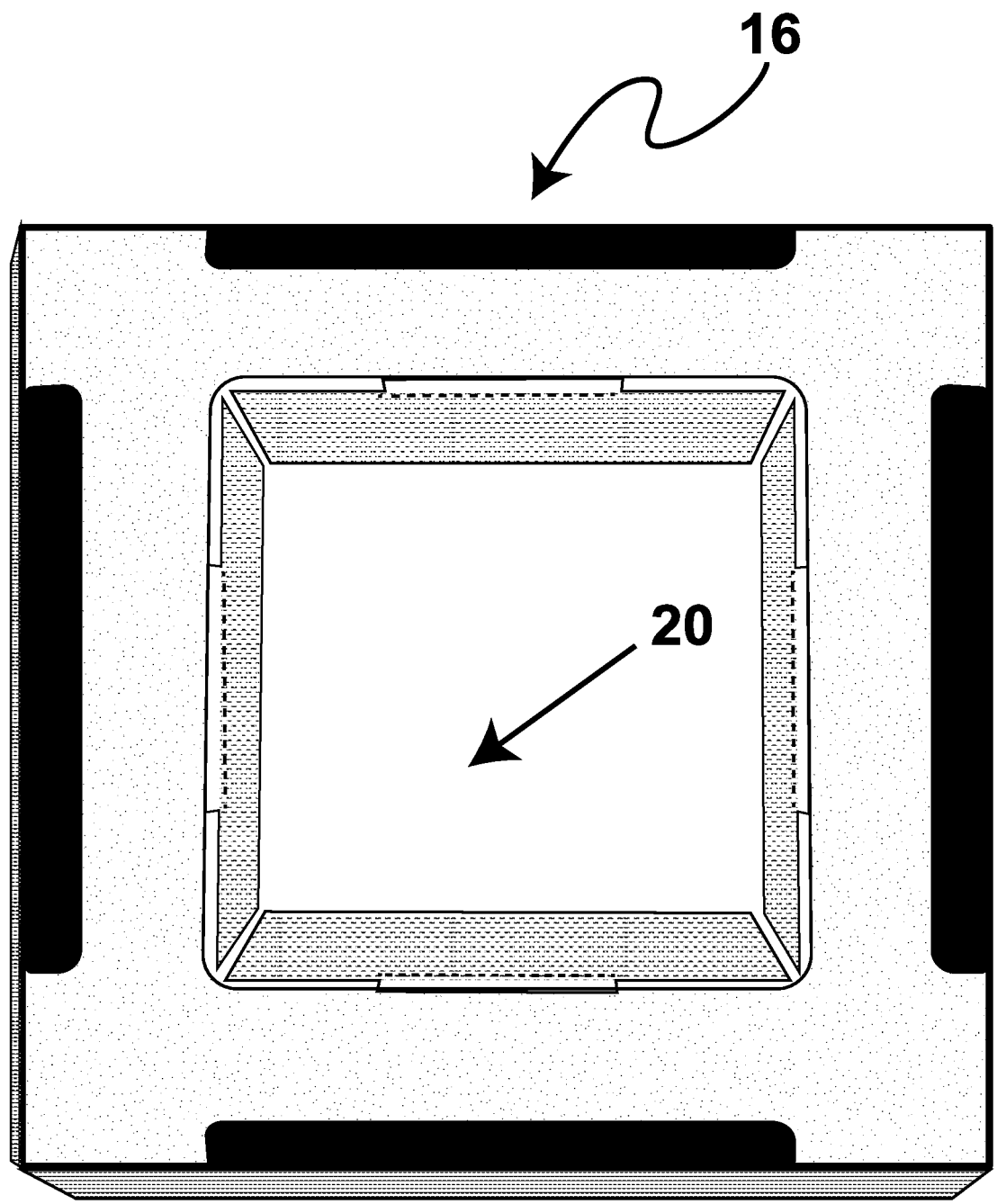
FIG. 4C is a photograph of a top plan view thereof.

Referring now to FIG. 1 through FIG. 4C, wherein like reference numerals indicate the same parts throughout the several views, packaging and delivery system, generally noted as 10, is shown according to an exemplary preferred embodiment of the present invention. The system 10 comprises essentially: an outer container 12 forming a windowed conduit 14; an inner tray 16 aligned within the windowed conduit 14; a containment membrane 18 supported in a first window 20 formed by the tray 16; and a pair of frangible sheathes 30 covering each end of the windowed conduit.

The outer container 12 may be formed in a box configuration having a conventional number of facets including: a front 40 opposite a back 42; a top 44 opposite a bottom 46; and a first side 48 opposite a second side 50. The outer container 12 may be forming of cardboard or a similar or functionally equivalent material for use as a product packaging. The outer container 12 may be formed in a cuboid or other convex polyhedron that creates and encloses an inner storage volume. In such a configuration the windowed conduit 14 may be formed between the front 40 and the back 42. The front 40 may be constructed as a hinged flap to enclose or access the inner storage volume. In such a configuration, the front 40 may form a second window 52 and the back 42 may form a third window 54. These two windows 52, 54 may be of similar shapes and sizes and aligned at opposite ends of the enclosed volume to thereby form the windowed conduit 14. Alternately these two windows 52, 54 may be of differing shapes and sizes, aligned at opposite ends of the enclosed volume, with a the window forming a discharge greater overall area than the window through which a discharge is urged. One or more access slots 43 may further be formed and may function to allow a user to insert flat, planar objects, such as cards, notes, gift cards, etc.

The inner tray 16 may be formed to fit within the enclosed volume by being placed within the opening formed by the hinged flap. The inner tray 16 may form the first window 20, which may be further formed of a similar size and shape as the second window 52 and third window 54. In its preferred embodiment the first window 20 formed by the tray 16 may be aligned within the windowed conduit 14 collinear with the second window 52 on the front 40 and third window 54 on the rear 44. The inner tray 16 may further form a series of aligned and coordinated slots 22 that can be used for receiving and guiding a gift card or the like into the discharge volume of the system 10.

The containment membrane 18 may be formed as a flexible paper, plastic or other similar or equivalent material. The containment membrane 18 may be flexible and filled with one or more contained gift or item 100. By supporting the filled membrane 18 within the first window 20 formed by the tray 16, the gift or item 100 may be retained within the containment volume.

The pair of frangible sheaths 30 covering each end of the windowed conduit prevent extrusion of the flexible containment membrane 18 or its contents 100 through either the second window 52 or third window 54. Each frangible sheath 30 may be formed of a tissue paper or other easily punctured material. It is intended that the frangible sheaths 30 may both be easily punctured with a manual percussive thrust, but also be of sufficient strength as to contain the contents 100 until a release is intended. Each sheath 30 may be secured about its respective window 52, 54 from either an inner or outer surface of the respective facet.

According to one aspect of the present invention the system 10 may be provided as an outer or inner wrapping for a single use that is consumed. According to an alternate aspect of the present invention, the system 10 may be adapted for multiple uses. In one such multi-use configuration, each of the sheaths 30 may be replaced when perforate by a similar replacement. Such a multi-use configuration may entail the use of tape or other adhesive about a perimeter of either the window or sheath so as to allow for attachment of replacements.

2. Operation of the Preferred Embodiment

When system 10 is assembled, the containment membrane 18 is filled with a gift content 100 to be delivered and the membrane 18 secured within the inner tray 16. The tray 16 is held within the outer container 10 such that the containment membrane 18 is positioned within the container such that contents 100 may be eventually delivered through the first outer window 20 and second outer window 52. The first outer window 20 is positioned on one side of the container 10 and covered with the first frangible element 30. A second outer window 54 is aligned with the first window 20 at the opposite side of the container 10. A second frangible element 30 covers the second window such that the containment membrane sits between the pair of aligned windows. The system 10 can be loaded with variable contents in such a position to be rigged for subsequent delivery.

An exemplary description of the operation of the system 10 may provide a method of deploying a wrapped gift, surprise or other object According to an exemplary preferred embodiment of the present invention shown in sequential steps in which the containment membrane 18 is positioned and placed within the windowed conduit 14. With the outer container 10 formed and the inner tray 16 secured within, the containment membrane 18 is placed through the first window 20 such that it forms a bag volume that is secured within and to the inner tray 16. The outer opening or periphery of the membrane 18 may be secured about a framed area circumscribing the first window 20. In such a configuration the membrane 18 is between the third window 54 and the aligned first and second windows 20, 52.

The loaded containment membrane 18 is in position within the windowed conduit 14 and is shown being filled with one or more prize, surprise, object or gift, etc. 100. With the outer periphery of the membrane 18 secured about the frame of the first window 20 creates an entry to the containment volume. As shown best in conjunction with FIG. 33 and FIG. 34, the membrane 18 as it is filled may conform to the overall containment volume of the outer container 10.

Once the container is filled it can be closed with the contents within the membrane 18 secured therein. The loaded containment membrane 18 retained within the tray 14 is secured within the outer container 10 is shown in sequential steps. The front flap 40 may thereby be sealed with an adhesive or similar closure mechanism.

Once sealed, the system 10 may be presented to a user as what may appear to be an otherwise conventional wrapped container. The outer container 10 provides the first frangible element 52 aligned with the second frangible element 54 with the flexible membrane 20 secured there between. In the event that there is a directionality of discharge, there may be indicia providing a striking target 102 on the appropriate frangible element.

Once loaded and secured the system 10 is ready for deployment. A user may secure the container 10 in one hand and "open" the package (or otherwise reveal or release the contents) by punching through the aligned windows with one's other hand. A user's first penetrates the second frangible element 54 and forces the contents 100 through the first window 20 to expel through the first frangible element 52. The contents 100 may then be discharged from the containment membrane 18 through the first and second windows 20, 52.

In the event that the membrane 18 is contained with confetti or other similar materials, the discharged debris and other contents may subsequently be collected and retained within the used membrane 18. By forming the containment membrane 18 into a reusable collection container, additional functionality may be achieved.

In an expanded functionality, the container 10 may be used with a separate contents bag insert 104 for containing a plurality of other loose contents. The party bag 104 may be configured to have a base perimeter shape to correspond with the first window 20 of the tray insert 16. The bag 104 can be filled with loose contents or other materials and sealed by tying. One or more extension flaps 106 may extend outward from the side of the bag 104 to allow for coordination with the slots 22 to aid in seating the bag 104 into the window 20.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of Warner-Jenkinson Company, v. Hilton Davis Chemical, 520 US 17 (1997) or Festo Corp. v. Shoketsu Kinzoku Kogyo Kabushiki Co., 535 U.S. 722 (2002), or other similar caselaw or subsequent precedent should not be made if any future claims are added or amended subsequent to this Patent Application.

What is claimed is:

1. A packaging system comprising essentially:
    a face forming an opening covered with a frangible central window through which contained contents are ejected;
    an outer container forming a windowed conduit;
    an inner tray forming an orifice aligned within the windowed conduit;
    a containment membrane supported in the orifice; and
    a pair of frangible sheathes, one covering each end of the windowed conduit;
   wherein the membrane secured within the inner tray is held within the outer container such that the containment membrane is positioned within the container and urged to delivered contents through the orifice and out the first outer window upon rupture of at least one of the frangible sheathes.

2. The packaging system of claim 1, wherein said containment membrane is adapted to form a collection container upon removal from the container.

* * * * *